Aug. 5, 1969   R. F. BREWER   3,460,037
TRAVELLING PROBE ARRANGEMENT FOR TESTING ADVANCING ARTICLES
Filed April 6, 1966   2 Sheets-Sheet 1
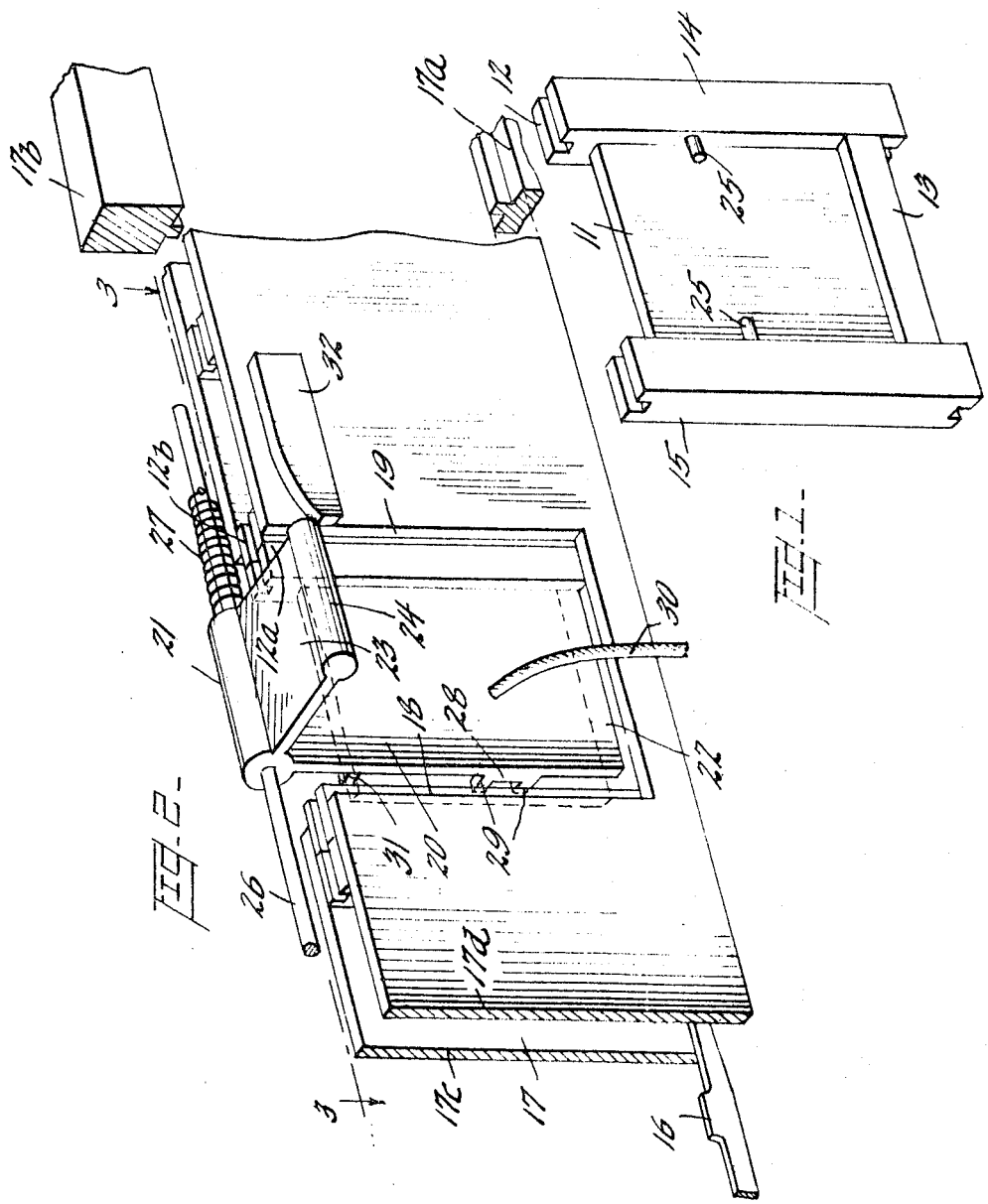
INVENTOR.
R. F. Brewer,
BY R. P. Miller
ATTORNEY

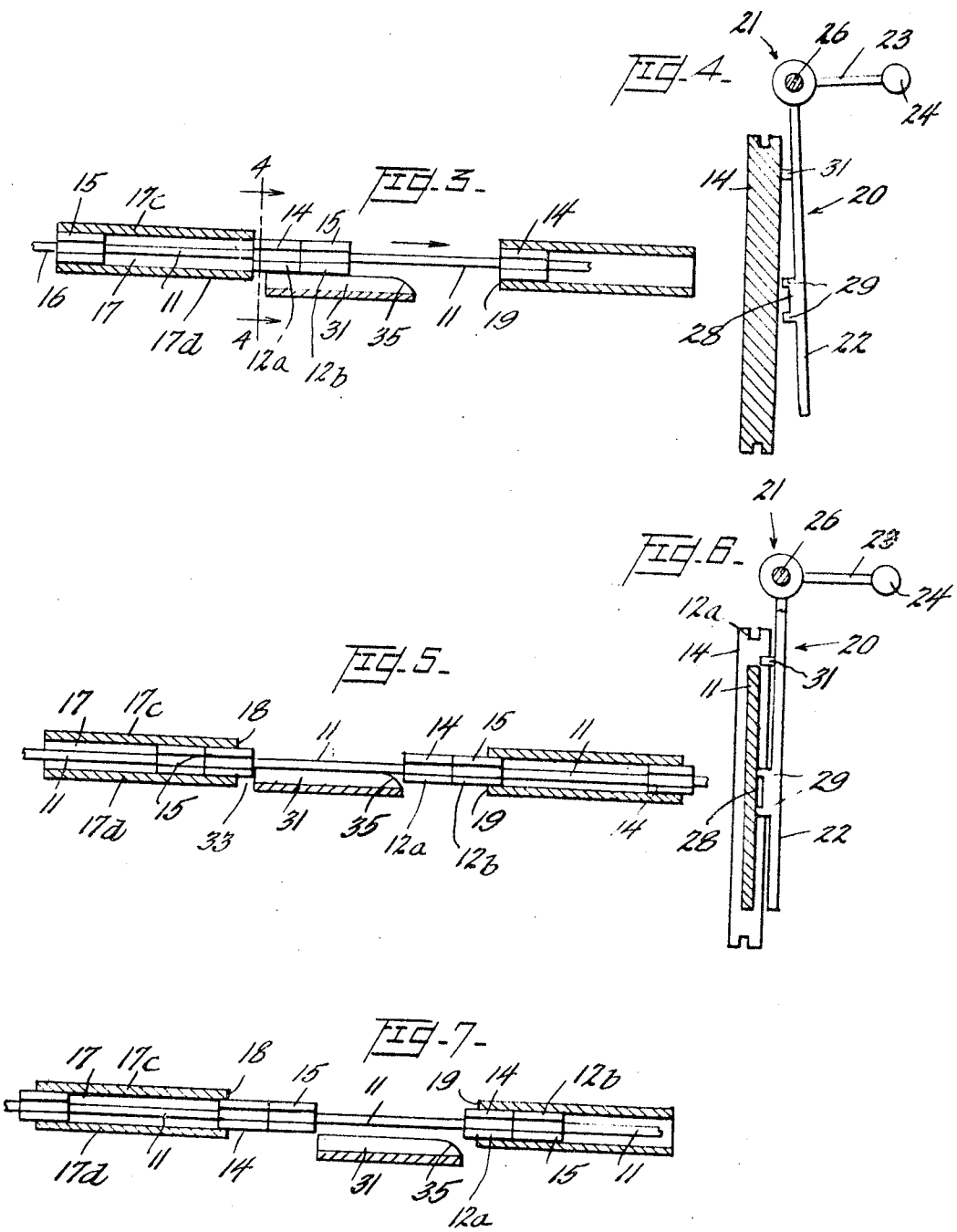

United States Patent Office 3,460,037
Patented Aug. 5, 1969

3,460,037
TRAVELLING PROBE ARRANGEMENT FOR TESTING ADVANCING ARTICLES
Robert F. Brewer, Bethlehem, Pa., assignor to Western Electric Company, Incorporated, New York, N.Y., a corporation of New York
Filed Apr. 6, 1966, Ser. No. 540,536
Int. Cl. G01r 27/02
U.S. Cl. 324—158                4 Claims

ABSTRACT OF THE DISCLOSURE

Sputtered tantalum sheets are moved through a sputtering chamber on successively advanced carriers. A surface of an advancing, leading carrier is withdrawn from an initial supporting contact with a weighted probe device. The probe device pivots into testing contact with a sheet on a trailing carrier. The pivoted probe device is driven forward by the advancing carrier, is utilized to test the sheet, and is then pivoted out of engagement with the sheet by a cam. A spring returns the disengaged probe device to its initial position.

---

This invention relates to an apparatus for testing moving articles and more particularly, to apparatus having test facilities which are movable into engagement with an advancing article, advanced with the article during a test operation, and then returned to an initial poistion in anticipation of a subsequent cycle of operation.

Tantalum sheets are manufactured in a continuous vacuum chamber by sputtering tantalum films on moving substrates. In order to produce sheets having uniform electrical characteristics the resistivity of the films must be constantly monitored. The sputtering process may be carried out in a machine having facilities for continuously advancing substrates from storage racks into the sputtering chambers and returning the film coated substrates to receiving racks. Heretofore, the sputtered films have been tested after loading into the receiving racks to provide information which may then be utilized to control the sputtering to vary the thickness of the films being deposited. This, however, introduces a time lag between measurement and correction which results in an undue number of out-of-tolerance sheets and a lack of uniformity between sheets.

An object of the invention resides in a new and improved apparatus for testing moving articles.

Another object of this invention is to provide a new and improved apparatus having test facilities adjacent to an advancing article which are brought into engagement with the article and translated with the article during a test operation, and then disengaged from the article and returned to an initial position.

A further object of the invention is to provide an apparatus having a plurality of spaced contacts which are successively moved into engagement with a series of film coated substrates being advanced from a tantalum sputtering machine.

With these and other objects in view, the present invention contemplates a plurality of spaced contacts which are advanced into engagement with a moving article, are conveyed along with the article for a predetermined distance, and are finally disengaged and returned to an initial position. More particularly, a test probe bracket supporting the contacts is mounted on a mechanism adjacent to a series of advancing articles carried in individual carriers known as "boats." The mechanism pivots the test probe bracket to move the contacts into engagement with the article, and an inner projection on the mechanism engages the carrier containing the article. The mechanism is moved with the article during a test operation. After completion of the test operation, the mechanism is disengaged from the carrier by a cam adjacent the advancing article and is returned by a spring to an initial position to await the next advancing article.

Other objects and advantages of the present invention will be apparent from the following detailed description when considered in conjunction with the accompanying drawings wherein:

FIG. 1 is a perspective view of a tantalum film coated substrate mounted in a carrier;

FIG. 2 is a perspective view of an apparatus for testing moving articles mounted in carriers that are advanced along a trackway, embodying the principles of the present invention;

FIG. 3 is a top-sectional view taken along line 3—3 of FIG. 2 showing a carrier carrying a tantalum sheet entering the testing operation;

FIG. 4 is a cross sectional view taken on line 4—4 of FIG. 3 showing position of a test probe device with respect to the carrier entering the testing apparatus;

FIG. 5 is a top-sectional view similar to FIG. 3 showing the carrier advancing with the test probe device;

FIG. 6 is a cross sectional view taken on line 6—6 of FIG. 5 showing the test probe device engaging the carrier and tantalum sheet; and FIG. 7 is a top-sectional view similar to FIG. 3 showing the carrier leaving the testing apparatus with the test probe device in position to return to an initial position in anticipation of testing the tantalum sheet on the next successive carrier.

Referring first to FIG. 1, there is shown a substrate 11 of ceramic or other material onto which a thin layer or film of tantalum has been sputtered. The tantalum coated substrate 11 is mounted in a carrier 12 which consists of a bottom member 13 and two upstanding side members 14 and 15. Projecting from opposite sides of members 14 and 15 are pins 25 which may be used to hold the substrate in place.

Referring now to FIG. 2, there is shown an endless conveyor 16 which advances a carrier 12a along a trackway 17 which has located along its length an open wall section between trackway portions 18 and 19. The trackway 17 may comprise bottom and top bars 17a and 17b and side walls 17c and 17d. Alternatively, the carrier may be pushed through trackway 17 without the use of an endless conveyor by a pusher device of the type shown in copending application to W. H. Fowler, Ser. No. 417,278 filed Dec. 10, 1964, now Patent No. 3,282,392. An L-shaped bracket 20, consisting of a hub 21, a depending leg 22 and a laterally projecting leg 23, is mounted for pivotal and sliding movement along a rod 26. There is a weighted protuberance 24 formed on or secured to the end of leg 23 which tends to pivot the bracket 20 to urge the depending leg 22 into the open wall section between trackway portion 18 and trackway portion 19. The rod 26 is mounted parallel to the path of travel of the carriers along the conveyor 16. A compression spring 27 is mounted on the rod 26 and secured at one end of the rod while the other end acts against the hub 21 to urge the bracket 20 toward the left and against a stop (not shown).

Test facilities may include a test probe 28 mounted on the front face of depending leg 22 of the L-shaped bracket 20. The test probe 28 carries a plurality (e.g. four) of spaced pointed contacts, as represented at 29, which are connected to one end of a cable 30. Cable 30 leads to a commercially available test set (not shown) for determining resistivity of the tantalum film engaged between the spaced contacts 29 on the test probe.

The front face of the depending leg 22 has a projection 31 (FIG. 4), having a length approximately equal to the distance between side members 14 and 15. The projection is positioned to engage a leading edge 33 (FIG. 5) of the side member 15. Projection 31 has a rounded portion 35 at its leading end. Mounted on the trackway wall 17 near the right-hand termination of the open section at trackway portion 19 is a cam 32 (FIG. 2) that is positioned to engage and pivot the leg 23 and the bracket 20 to withdraw the test probe 28 and the contacts 29 from engagement with the film of the substrate 11.

Referring now to FIGS. 3, 4, 5, 6 and 7 for consideration of the pivotal and sliding operation of the L-shaped bracket 20 through the test operation, assume first that a testing operation has just been completed on a substrate 11 mounted in a carrier 12b, and second, that the bracket is in the left-hand position to initiate a testing of the substrate mounted in the next succeeding carrier 12a. As the carrier 12a enters the open wall section between portions 18 and 19 of trackway 17, the leading side 14 is in sliding contact with the inner projection 31 to maintain the L-shaped bracket 20 from pivoting under the action of the weighted protuberance 24. When the carrier 12a (FIGS. 5 and 6) advances into the open wall section of trackway 17 and the lagging side member 15 enters the open wall section between trackway portions 18 and 19, the L-shaped bracket 20 is permitted to gradually pivot under the influence of the weighted protuberance 24, as side member 14 moves along rounded portion 35 of projection 31. As depending leg 22 pivots into the area formed between the two side members 14 and 15, the test probe 28 moves the pointed contacts 29 into engagement with the tantalum covered substrate 11. By the time the contacts 29 have engaged the substrate 11, the inner projection 31 of the depending leg 22 has engaged the leading edge 33 of the lagging channel member 15 of carrier 12a. The carrier 12a advances the L-shaped bracket 20, while the hub 21 compresses the spring 27 to allow the test probe 28 to move along with the advancing carrier. The advancing lateral leg 23 then engages the lift cam 32, and is pivoted upwardly to move projection 31 from engagement with the leading edge of the side member 15. When lateral leg 23 pivots the L-shaped bracket 20 about rod 26, the test probe 28 is moved to interrupt the test circuit through spaced contacts 29 and cable 30. As the inner projection 31 clears the leading edge of side member 15, the compressed spring 27 causes the L-shaped bracket 20 to return to the initial position in anticipation of another testing operation on the next carrier advanced by the conveyor 16.

What is claimed is:

1. An apparatus for testing a substrate advanced by a carrier having upstanding channel members for supporting said substrate;
   a trackway for receiving said carrier, said trackway having an open wall section;
   a rod mounted over and laterally spaced from said open section;
   a hub slidably and rotatably mounted on said rod;
   a first arm depending from said hub and having a series of probes mounted thereon for movement through said open wall section into engagement with a substrate on a carrier in said open section;
   a second arm laterally projecting from said hub for urging said first arm to move said probes into engagement with the substrate positioned in said open section;
   means for advancing said carrier and substrate positioned in said open section;
   means on said first arm for engaging one of said channel members to slide the hub along said rod; and
   means rendered effective after a predetermined advance of said hub for rotating said arm to move said first arm and probes from engagement with said substrate.

2. An apparatus for testing a substrate advanced by a carrier as set forth in claim 1, including:
   means for resiliently urging said hub in a direction opposing the advancing movement of said advancing means.

3. In apparatus for testing articles:
   a longitudinally moving conveyor including a plurality of article carriers each having a driving surface facing longitudinally forward and a blocking surface;
   a probe device mounted adjacent said conveyor for movement laterally and longitudinally thereof, said probe device biased laterally toward the conveyor to contact an article in a longitudinally intermediate testing position of the probe device and including a driven surface positioned to be engaged by a driving surface of an article carrier to be moved therewith in said testing position of the probe device, a blocking projection positioned to engage a blocking surface of an article carrier to block initially a lateral movement of the probe device into testing contact with a carried article in a longitudinally rearward blocking position of the probe device as long as the blocking surface of an article carrier is adjacent said blocking position, and a cam-engaging surface for moving the probe device against said bias and laterally out of testing contact with a carried article in a longitudinally forward camming position of the probe device;
   fixed camming means positioned to contact the cam engaging surface of the probe device in said longitudinally forward camming position while a trailing article carrier is located with its blocking surface adjacent said blocking position for moving the probe device laterally away from testing contact with a leading article in a leading article carrier; and
   return means rendered effective by movement of the probe away from testing contact with the leading article for moving the probe device longitudinally rearwardly into said blocking position of the probe device with the blocking projection of the probe device engaging the blocking surface of the trailing article carrier.

4. In apparatus for testing articles as set forth in claim 3:
   a rod extending longitudinally adjacent said conveyor;
   said probe device comprising a member pivotally supported on said rod and weight-biased laterally toward testing contact with an article in an article carrier; and
   said return means comprising means mounted on said rod biasing said probe device member longitudinally rearwardly and rendered effective upon said camming means moving the probe device member laterally away from testing contact with a leading article for driving the probe device member longitudinally rearwardly along the rod and into said blocking position.

References Cited

UNITED STATES PATENTS

| 2,540,843 | 2/1951 | Stover | 324—158 |
| 2,711,523 | 6/1955 | Willis. | |
| 3,144,938 | 8/1964 | Wahl | 209—81 |
| 3,175,153 | 3/1965 | Paessler | 324—158 |

RUDOLPH V. ROLINEC, Primary Examiner

E. L. STOLARUN, Assistant Examiner